United States Patent
Hinderling et al.

(10) Patent No.: US 10,345,434 B2
(45) Date of Patent: Jul. 9, 2019

(54) TIME-OF-FLIGHT MEASUREMENT APPARATUS AND TIME-OF-FLIGHT MEASUREMENT METHOD WITH AMBIGUITY RESOLUTION IN REAL TIME

(71) Applicant: HEXAGON TECHNOLOGY CENTER GMBH, Heerbrugg (CH)

(72) Inventors: Jürg Hinderling, Marbach (CH); Reto Stutz, Berneck (CH); Julien Singer, Berneck (CH); Rainer Wohlgenannt, Klaus (AT); Simon Bestler, Langenargen (DE)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 453 days.

(21) Appl. No.: 15/212,014

(22) Filed: Jul. 15, 2016

(65) Prior Publication Data
US 2017/0016981 A1    Jan. 19, 2017

(30) Foreign Application Priority Data
Jul. 17, 2015 (EP) .................................. 15177315

(51) Int. Cl.
  *G01C 3/08* (2006.01)
  *G01S 7/486* (2006.01)
  (Continued)

(52) U.S. Cl.
  CPC ............ *G01S 7/4865* (2013.01); *G01S 7/487* (2013.01); *G01S 17/10* (2013.01); *G01S 17/102* (2013.01); *G01S 17/42* (2013.01)

(58) Field of Classification Search
  CPC ........ G01S 17/10; G01S 17/42; G01S 17/102; G01S 7/487; G01S 7/4865
  (Continued)

(56) References Cited

U.S. PATENT DOCUMENTS 4,025,193 A * 5/1977 Pond ...................... B64D 39/00
                                                    244/135 A
6,031,601 A    2/2000 McCusker et al.
(Continued)

FOREIGN PATENT DOCUMENTS

CN     101034155 A     9/2007
CN     101866165 A    10/2010
(Continued)

OTHER PUBLICATIONS

Payne, A.D., et al., "Multiple Frequency Range Imaging to Remove Measurement Ambiguity," Proceedings of at 9th Conference on Optical 3-D Measurement Techniques, Vienna, Austria, pp. 139-148 (Jul. 1-3, 2009).

(Continued)

*Primary Examiner* — Mark Hellner
(74) *Attorney, Agent, or Firm* — Maschoff Brennan

(57) ABSTRACT

The invention relates to a distance measurement apparatus for measuring the time of flight of electromagnetic signals, having at least: a transmitter for transmitting coded transmission signals according to a pattern specified by a coder, a receiver for detecting the signals reflected by at least one object as receive signals, a counter unit having a time counter for writing time counter values, which are generated in each case with the transmission of the transmission signals and the receipt of the receive signals, into at least one register, and a control and evaluation unit for calculating the time of flight on the basis of decoding the receive signals and reading the register of the counter unit.

18 Claims, 11 Drawing Sheets

(51) Int. Cl.
*G01S 17/10* (2006.01)
*G01S 17/42* (2006.01)
*G01S 7/487* (2006.01)

(58) Field of Classification Search
USPC ........................................................ 356/5.01
See application file for complete search history.

(56) References Cited

U.S. PATENT DOCUMENTS

| | | | |
|---|---|---|---|
| 6,628,374 B2* | 9/2003 | Shirai | G01S 17/10 342/135 |
| 7,944,548 B2 | 5/2011 | Eaton | |
| 2012/0287417 A1* | 11/2012 | Mimeault | G01C 3/08 356/5.01 |
| 2015/0070683 A1 | 3/2015 | Legere et al. | |
| 2016/0047903 A1* | 2/2016 | Dussan | G01S 7/484 356/5.01 |

FOREIGN PATENT DOCUMENTS

| | | |
|---|---|---|
| CN | 102830610 A | 12/2012 |
| EP | 1832897 A1 | 9/2007 |
| EP | 2626722 A1 | 8/2013 |
| EP | 2889642 A1 | 7/2015 |
| WO | 99/13356 A2 | 3/1999 |

OTHER PUBLICATIONS

Jansson, et al., "A Multi-Channel High Precision CMOS Time-to-Digital Converter for Laserscanner Based Perception Systems," IEEE Transactions on instrumentation and measurement, IEEE Service Center, Sep. 1, 2012.

European Search Report dated Feb. 5, 2016 in application No. 15177315.7.

\* cited by examiner

TIME-OF-FLIGHT MEASUREMENT APPARATUS AND TIME-OF-FLIGHT MEASUREMENT METHOD WITH AMBIGUITY RESOLUTION IN REAL TIME

FIELD OF THE INVENTION

The present invention relates to an apparatus for ambiguity resolution in electronic distance measurement and to a method.

BACKGROUND

Generic surveying instruments using the time-of-flight method are, for example, laser scanners, profilers, rotation lasers, LIDAR, laser trackers and recently also total stations, as are used in geodetic measurement tasks. The principle used herein substantially consists of emitting pulsed electromagnetic radiation, such as for example laser light, onto a target to be surveyed, and subsequently receiving the reflection that is returned by the target, wherein the distance to the target is determined on the basis of the time of flight of the pulses. Such pulse time-of-flight measuring systems are standard solutions nowadays in many different fields of application.

Different approaches are used to detect the scattered-back pulses. In what is known as the threshold value method, a light pulse is detected if the intensity of the incoming radiation exceeds a specific threshold value. The other approach that is relevant here is based on the temporally very precise sampling of the scattered-back pulse. An optical signal that is scattered back by a target object is captured by a detector. The electric signal generated by the detector is converted into a digital signal sequence using an analog-to-digital converter. This digital signal is subsequently processed further typically in real time. In a first step, the signal, often modulated as a pulse, is detected through special digital filters and subsequently its position within the signal sequence is determined. By using a large number of sampling sequences, it is possible to identify a useful signal even under unfavorable conditions, such that even larger distances or noisy background scenarios can be managed.

Known as prior art are sampler apparatuses that sample the time axis with much more than 10 GHz. In the case of special sampler apparatuses, sampling is carried out by sampling many identical pulses with additional phase shift, and in the process very fast sampling rates in the gigahertz range are virtually realized even with slower hardware components. EP 1 832 897 B1 also describes that it is possible with the same ultrafast sampling method to receive pulses or pulse sequences that are coded or modulated in amplitude, phase, polarization, wavelength and/or frequency. Sampling of non-identical, for example amplitude-modulated pulses in the high frequency range is likewise possible, even if large amounts of data arise in a very short period of time during evaluation.

One of the simplest types of modulation is the marking of the individual impulses or the pulse sequences per distance coding. This is used for example for the purposes of re-identifiability. This recognition is necessary if an ambiguity occurs which can be caused by different situations in the time-of-flight measurement of pulses. In principle, the non-uniqueness is created by there being more than one pulse or a pulse group between the surveying device and the target object. This problem is also described in detail in document EP 1 832 897 B1. The non-uniqueness can additionally also be made more difficult on account of the fact that the pulses returning to the surveying device mix with one another, that is to say return with a different sequence than that with which they were sent. The latter can occur whenever a plurality of pulses are "in flight" at the same time, or in other words: if the transmission pulse distance is shorter than double the measurement distance.

A so-called ambiguity distance is characterized by the longest distance at which the reflected signal still returns to the measurement device within a transmission period, wherein the signal can comprise one or more pulses, that is to say a pulse sequence or a burst. For the time-of-flight measurement as for the phase difference method, the phenomenon of ambiguity is known and is generally resolvable up to that distance corresponding to the longest period (ambiguity distance). For example, the periodicity of the transmission signal sequence is matched such that the distance to the object remains within the ambiguity distance. An object distance which is further away thus results in a lower frequency and measurement rate, if ambiguity is intended to be avoided. The longest period, however, can also be coded by the long periodicity contained implicitly in the transmission signal coding. The simplest example to be mentioned here is the modulation consisting of two high frequencies, which generate long periodic beats. It is not even necessary here for both frequencies to be emitted at the same time. Such coding methods, which can be altered in many variants, up to the spread spectrum method having a high frequency content, among others, have already been used for decades in phase difference methods. It is also known that when using high frequencies having long periodic beats, the measurement rate does not lower, but instead only the latency time until the distance information is captured gets longer. The minimum latency time here corresponds to the time of flight of light over the ambiguity distance.

Additionally, sudden distance jumps between the surveying device and the respective target object can result in so-called pulse wrapping, that is to say a change in the sequence of the reflected pulses as compared to the original sequence upon emission. In particular, this occurs in fast rotating laser scanners or profilers, if a pulse that is transmitted later nevertheless arrives at the receiver earlier, since it was transmitted onto a closer located target object and the pulse distance was not large enough to let the previously emitted pulse arrive first.

Another ambiguity occurs if a pulse or a pulse sequence strikes more than one target object, for example partially strikes a house edge and partially an area located behind the house. As a result, the signal is reflected more than just once from different distances, which complicates the measurement evaluation since it can no longer be determined uniquely from where the second echo originates.

Distance measurement apparatuses with pulse coding are therefore known from the prior art. In EP 1 832 897 B1, for example, a time-of-flight measurement apparatus is described in which five or more pulses are in flight between transmitter and receiver at the same time. As a result, for example a distance measurement apparatus positioned at an aircraft can measure at a very high pulse rate with many pulses in the air at the same time. The invention described, however, does not concern any specific modulation recognition of receive pulses and no method for resolving overlapping or interleaved pulses of multiple targets either.

U.S. Pat. No. 6,031,601 A also furthermore discloses that for distance measurement, a polychromatic or monochromatic light source is modulated using a pseudo-randomized number code generator. The light received by the target is decrypted according to the coding and the distance is calculated therefrom. This solution has the disadvantage that the generated RN coding sequences (random noise) have a large duty cycle, that is to say a large ratio of pulse duration to period duration. As a result, practically only small "breaks" between the signal pulses are present, which in the case of multiple targets leads to overlaps and to no simple separation of multiple targets being possible anymore in the time range of the receive signal representation.

US 2015/0070683 A1 discloses a distance measurement method per phase or interval modulation for scanning time-of-flight instruments. Herein, the intervals from pulse to pulse are coded and the evaluation of the receive pulses is carried out using a time that has elapsed since the transmission time of the last emitted pulse. This relative time of flight is then compared to the relative time of flight of the preceding pulse pair. The ambiguity resolution here is based on the comparison of the observed relative difference scheme with an expected scheme according to the generation by the special phase modulation. The relative distances are different for each interval, as a result of which the uniqueness can be resolved by way of searching prespecified tables (determined by this special modulation). The teaching from US 2015/0070683 A1, however, has the disadvantage that it works only for this one special type of signal modulation, and also that the pulse identification in the case of multiple targets is no longer unique—enormous data gaps would result in this respect in the true/false adjustment. In the document US 2015/0070683 A1, the disadvantage of the susceptible ambiguity resolution is partially resolved or alleviated using an additional phase shift from vertical scanline to vertical scanline.

WO 99/13356 describes an optoelectronic distance measuring device which has burst modulation. This apparatus is able to generate a sequence of optical pulses with adjustable burst lengths and adjustable phase shifts. As a result, for example, the signal-to-noise ratio is situationally optimized, and the time resolution of the receive signal can also be improved. A robust signal evaluation to resolve a uniqueness problem, however, is not disclosed.

SUMMARY

Some embodiments of the present invention provide an improved time-of-flight measurement apparatus or an improved time-of-flight measurement method for robust evaluation of the signals with respect to occurring ambiguities.

Some embodiments of the invention provide an improved time-of-flight measurement apparatus or an improved time-of-flight measurement method for the robust evaluation of the signals with respect to ambiguities triggered by distance jumps.

Some embodiments of the invention provide an improved time-of-flight measurement apparatus or an improved time-of-flight measurement method for the robust evaluation of the signals with respect to ambiguities triggered by multiple targets.

The invention relates to a distance measurement apparatus for measuring the time of flight of electromagnetic signals, having at least: a transmitter for transmitting coded transmission signals according to a pattern specified by a coder, a receiver for detecting the signals reflected by at least one object as receive signals, a counter unit having a time counter for writing time counter values, which are generated in each case with the transmission of the transmission signals and the receipt of the receive signals, into at least one register, and a control and evaluation unit for calculating the time of flight on the basis of decoding the receive signals and reading the register of the counter unit.

The transmission signals can likewise be guidable to the receiver as reference signals through feedback inside the apparatus, wherein the control and evaluation unit is also configured for decoding the reference signals.

The counter unit can furthermore have a signal coding counter, which generates, simultaneously with each signal emission, an associated signal coding counter value which correlates to the coding of the respective transmission signal.

Coding of the signals can here comprise at least one of: interval modulation, amplitude modulation, frequency modulation, distance-modulated double or multiple pulses, burst modulation, polarization modulation, wavelength modulation.

The control and evaluation unit can also be configured to directly identify the received signals after the decoding as the reflections of the transmitted signals.

The control and evaluation unit can furthermore be configured to directly calculate the distance traveled by the transmitted signals, which are recognized as returning signals and identified by way of decoding, on the basis of the time counter values.

The control and evaluation unit can be additionally or alternatively configured to directly calculate the distance traveled by the transmitted signals, which are recognized as returning signals and identified by way of decoding, on the basis of the time counter values and the signal coding counter values.

Generating a signal coding counter value can trigger the beginning of a recording period, wherein the recording period is associated in particular with each signal coding counter value and/or the time counter value at the beginning of the recording period.

The recording period is in particular at least long enough to comprise a complete sequence of a coded signal sequence.

A plurality of recording periods can, in terms of time, follow each other seamlessly or they can overlap.

The control and evaluation unit can be configured to calculate the distance traveled by the transmitted signals, which are recognized as returning signals and identified by way of decoding, on the basis of the time counter value at the transmission time of the transmission signal, the time counter value at the starting point of the recording period in which the signal was received, and the temporal position of the receive signal within the recording period.

The control and evaluation unit can furthermore be configured to calculate the distance traveled by the transmitted signals, which are recognized as returning signals and identified by way of decoding, on the basis of the signal coding counter value of the recording period, and the temporal position of the receive signal within the recording period.

The signal duty cycle is preferably below 50%, in particular below 5%, in particular below 0.5%.

The reference signals received by the receiver can be orthogonal to the receive signals reflected by the targets.

In addition to the received pulses, a data buffer or buffer can also register the transmitted signals, or simply information relating to the identity of the signal and the time of transmission as a time stamp. Analog detection of the transmission signal as a start pulse or reference pulse is effected for example, as is known from the prior art, either on the basis of optical deflection via at least one partially transmissive mirror, which guides the laser transmission signal to the photo receiver, or on the basis of an internal electrical channel, which guides the transmission trigger sequence onto the electronic receive channel.

A counter which is realized by way of hardware or software generates and registers the coding of transmitted pulses or pulse sequences modulated according to a coding pattern. The coding pattern can here be an interval modulation, amplitude modulation, frequency modulation or another form of modulation. The signature of the last or currently transmitted pulse is thus stored.

Alternatively or additionally to the above-mentioned counter, a clock that is exact to the sub-nanosecond can be implemented, which permits, like the above-mentioned counter, at least the transmission and receive times of the pulses or pulse sequences. A clock here designates substantially merely a rapidly incrementing counter which implicitly captures the signal coding.

In a first embodiment, the continuous capturing of the received signals is realized by way of a data buffer, the length of which corresponds to the temporal distance of the period of the transmission pulse sequence (for example a few MHz). The data buffer thus captures the number of sampling points of the analog-to-digital converter within a transmission pulse period. This data buffer is also designated below as a digital record window (DRW) or sampling window. The identity ascertained with the counter also marks, on the receiving-side in this first exemplary embodiment, the—synchronously active—digital record window (DRW) or sampling window. The signal which is recorded in turn and sent back from the target object is correspondingly re-identified and decoded and can thus be directly associated with the corresponding transmission signal. The DRW is substantially a buffer which stores the receive signal form sampled with an analog-to-digital converter in the GHz range. The signal is sampled seamlessly by the optical receiver and written continuously to a DRW. In the case of previous knowledge of arrival times of pulses, a record window can also record only a partial interval (range gate) and buffer it. The "sampled" signals, generally also referred to as waveform, comprise the intensity profiles of the received pulses, but also long periods without useful signals which possibly occur as noise. These recording or buffering functions occurring in the nanosecond or even sub-nanosecond range are nowadays realized largely in field programmable gate arrays (FPGA).

In the case of multiple pulses and multiple targets, it is advantageous that the buffer length seamlessly records the entire time period from transmission pulse to transmission pulse. In the case of a phase modulation (PM), that is to say the encrypting deviation of the intervals from a uniform scheme, the buffer length can correspondingly differ from pulse to pulse or from pulse sequence to pulse sequence. However, the buffer length can also have a recurring identical length, which corresponds to the mean of the interval of a phase modulation, for example. By arranging a plurality of buffers in series, an arbitrarily long time axis section is recorded.

Alternatively, a single buffer length can also comprise a plurality of intervals or pulse sequence periods. It is also possible for a plurality of buffers to be active in temporally parallel or partially overlapping fashion.

According to one aspect of the invention, the counter counts for example from 1 to n, if n different coded signals were programmed into the distance measurement apparatus. As a result, each transmitted signal pattern is associated with an identification number. At the same time, the corresponding number is associated with the receiver-side, active record window. For relatively short distances, the active DRW receives and registers the distance measurement pulse with the same coding. However, in distances in which the previously transmitted signal is not received before the transmission of the next signal, the ascertained identification number of the received distance measurement pulse does not correspond to the counter number of the current record window. The difference between the two counter numbers directly indicates how many DRWs and thus how many pulse intervals or pulse periods are between transmission and reception. This number or the associated interval times of the elapsed pulse intervals are to be added to the time of flight measured in the current record window, as a result of which the entire time of flight of the currently received and identified distance measurement pulse is obtained. The counter has in this simplest embodiment two functions: first, it captures the code of the current transmission pulse, and secondly, it counts directly the number of complete time intervals (transmission pulse periods) which have elapsed between transmission and receiving a pulse with the same coding.

This improved time of flight measurement method with direct decoding (for example in real-time on an FPGA) is likewise more robust with respect to ambiguities triggered by distance jumps. In the case of any sequence changes generated by distance measurement jumps, the ascertained identification number of the received signal pulse or of the signal pulse sequence can be associated correctly, and without any a priori assumptions, with the transmission pulse, the entire time of flight can be evaluated, and the associated absolute distance from the target object can be calculated.

In the case of n different emitted signal patterns, which continue to repeat temporally in the same order, the achievable maximum distance which can be uniquely decrypted is the distance which corresponds to the path section of light that has traveled over n pulse intervals.

It is possible by way of the coding signature of each individual receive pulse and by way of a pulse counter (having the currently transmitted coding signature) to robustly calculate the true distance over the entire ambiguity distance directly—and for example without coding-dependent a priori tables and case discrimination.

In the case of multiple targets, the number of reflected pulses doubles and a simple coding/decoding rule, such as the pulse interval modulation, can result in error solutions. It is therefore advised in the case of multiple targets to select a pulse coding type that has coding redundancies with respect to pulse doubling. Since the inventive method with the direct decoding of the received pulses and the temporal association with a transmission pulse of the same coding is open with respect to almost all conceivable types of signal coding, it is possible to select a coding type with high redundancy. A first approach of increasing the code redundancy and thus achieving avoidance of errors and robustness is the use of double coding.

According to a further aspect of the invention, it is not only the time of flight distance with respect to the directly preceding receive signal, but also a longer sequence that is taken into consideration. The robustness is increased by the fact that the receive buffer lengths that are intended for signal registration and evaluation and are associated with the transmission pulse codings are exactly as long as the respective total code lengths. For this reason, it is not only the time of flight distance to the directly preceding receive pulse, but also a longer sequence that is taken into consideration.

If the signal comprises for example a sequence having a total code length of n phase-coded pulses, a DRW (of which there are likewise n) occurs in each case between the transmission times of the i-th pulses, with i being 1 to n. As a result, i DRWs that are associated with the i-th pulses are temporally offset parallel with respect to one another.

In an FPGA, upon transmission of the pulse i, a buffer with the index i is started which continues up to the transmission of the next identical pulse i. If the associated buffer i is filled, it is searched for the pulse form of the pulse i. The pulses having a different signature are discarded in this buffer. Subsequently, for example, the strongest targets with code i are processed normally, wherein the true pulse time of flight and thus the true distance can be calculated directly, because the DRW buffers having the same signature follow one another without time gaps. In the case of a profiler or scanner, this measured distance is stored directly combined with the direction angles which are likewise associated with the transmission pulses i. Since every buffer must wait until its ambiguity distance is filled, the order of the pulses i in itself is maintained, even if any distance jump occurs within the course of the ambiguity distance.

As an alternative to the simple search for a signal pattern having code i by way of interval, amplitude or other pulse coding, it is also possible to compare part of or the entire length of the coded pulse sequence as a whole in the form of a reference pulse sequence. This can be effected in particular in the form of a cross-correlation and has the advantage that multiple targets can be detected and resolved by the signal evaluation. In the case of double targets, a correlation search gives two receive pulses of the same pattern with code i, with the evaluation process in each case outputting a distance to the two associated objects.

The memory requirement which is increased here can be compensated for, owing to the thin occupation of the data (very short signal duty cycle), by a resource-friendly implementation in the FPGA. Likewise, the DRWs can be emptied by way of immediate forwarding in an intermediate buffer, such that at most n+1 DRWs need to be active.

According to a further aspect of the invention, only a single DRW can be used for sampling so as to optimize storage. By indexing pulses and DRWs via a counter (i from n), the sampling storage requirement can be reduced to a single DRW length. The time-of-flight information is then available only after the longest measurement distance to be determined has been traveled, but only the relative fine distances within a DRW (distance over time of flight from DRW start to pulse occurrence) together with the respective receive pulse codes and the DRW counter values of the respective DRW are stored. It is possible with the pulse code number ascertained on the basis of decoding and the DRW counter number to determine the number of wrap-arounds. The final time of flight is then equal to the relative time in the evaluated DRW plus the duration of all preceding DRW buffers. Additional robustness can be achieved by way of multiple, redundant coding. It is thus possible, for example, to code both the pulse group and the distance of the pulse group.

According to a further aspect of the invention, the signals can be coded on the basis of a burst which differs in particular from the respectively preceding burst. To maximize the robustness, it is possible in a special embodiment for the burst patterns to be configured to be signal-theoretically orthogonal with respect to one another such that the cross-correlations of their waveforms are zero. The ambiguity distance is obtained from the number of the available different burst codes multiplied by the distance of the bursts.

According to a further aspect of the invention, signals that are returning from the target object and arrive at the receiver of the surveying device at the same time can be differentiated by way of generating the individual signals in different polarizations. As a result, overlapping signals detected on the receiving sensor can be kept apart with respect to their polarization. In addition, shortening of the duty cycle reduces the probability of an overlap, by the signals (bursts, modulated pulses, pulse sequences etc.) being configured to be as short as possible and the breaks between the signals being configured to be as long as possible.

According to a further aspect of the invention, the recording period (DRW) is variable in terms of its length. In particular, the DRW closes automatically as soon as at least one signal associated with it is recognized. This is possible because the decoding of the signals recorded by the recorder takes place in a seamless streaming process.

As a result, the buffer is only as long as necessary, and does not unnecessarily occupy the memory. Here, the DRW has a maximum length or an interruption criterion, as a result of which it closes automatically upon failure to find the signal.

According to a further aspect of the invention, the recording period (DRW) is fragmented in pieces of preferably the same size. The DRW builds up in increments again by way of streaming, until the signal to be identified is recognized. Subsequently, the memory is again freed up.

According to a further aspect of the invention, a sequence without block-wise buffering of the sampling data generated by the A/D converter is also possible. The data is "seamlessly" assigned in the sampling cycle, for example, into a shift register for further processing. This is a further way of optimizing memory. In this method of data acquisition and further processing, the time axis is no longer captured in blocks, but captured continuously from signal sample to signal sample, analyzed and processed. To ascertain the light signal time of flight between the surveying apparatus and the target object, a counter, as is described in the above embodiments, is no longer sufficient in this method. In this seamless method, the counter, which in the above embodiments counts both the identification of the coded transmission signals and the time intervals (DRW) which have elapsed, only marks the individual coding of the transmission signal. Since clocks managed with FPGA technology nowadays increment in nanosecond cycles (for example clocks as fast counters with a data width of more than 16 bit), it is possible to provide the time point of the laser signals with time stamps which are held as rough values of the starting time together with the pulse identities (counter values). The time of the exact starting pulse to the picosecond is ascertained using a known subsampling interpolation method from the signal samples which are buffered transiently in the shift register and likewise stored. The received data in the shift register is continuously searched for example using a pulse recognition law or a cross-correlation in the sampling cycle. If a receive signal having a sufficient SNR (signal-to-noise ratio) is detected, it is provided with a time stamp. In addition, the fine shift of the signal pulse with respect to the sampling grid is determined with a known subsampling interpolation method and both times are stored in a register. At the same time as the time stamping (alternatively not until a later step), the receive signals are decoded and marked with the code index. The code index which matches the current receive signal, i.e. is identical, of the starting pulse is searched for, preferably in real time, and the time of flight is calculated directly from the associated stored time stamps.

The time data here comprises the nanosecond-accurate rough measurement with the picosecond time interpolation values.

Alternatively, it is also possible to dispense with the pulse identification counter. The counter that increments as a clock in the nanosecond cycle, with a width of for example 18 bit, is certainly sufficient to record all relevant time and coding information over a measurement distance of a few kilometers.

BRIEF DESCRIPTION OF THE DRAWINGS

The method according to the invention and the apparatus according to the invention will be explained in more detail purely by way of example below with reference to concrete exemplary embodiments illustrated schematically in the drawings, wherein further advantages of the invention will also be mentioned. Specifically.

DETAILED DESCRIPTION

Figure 1:
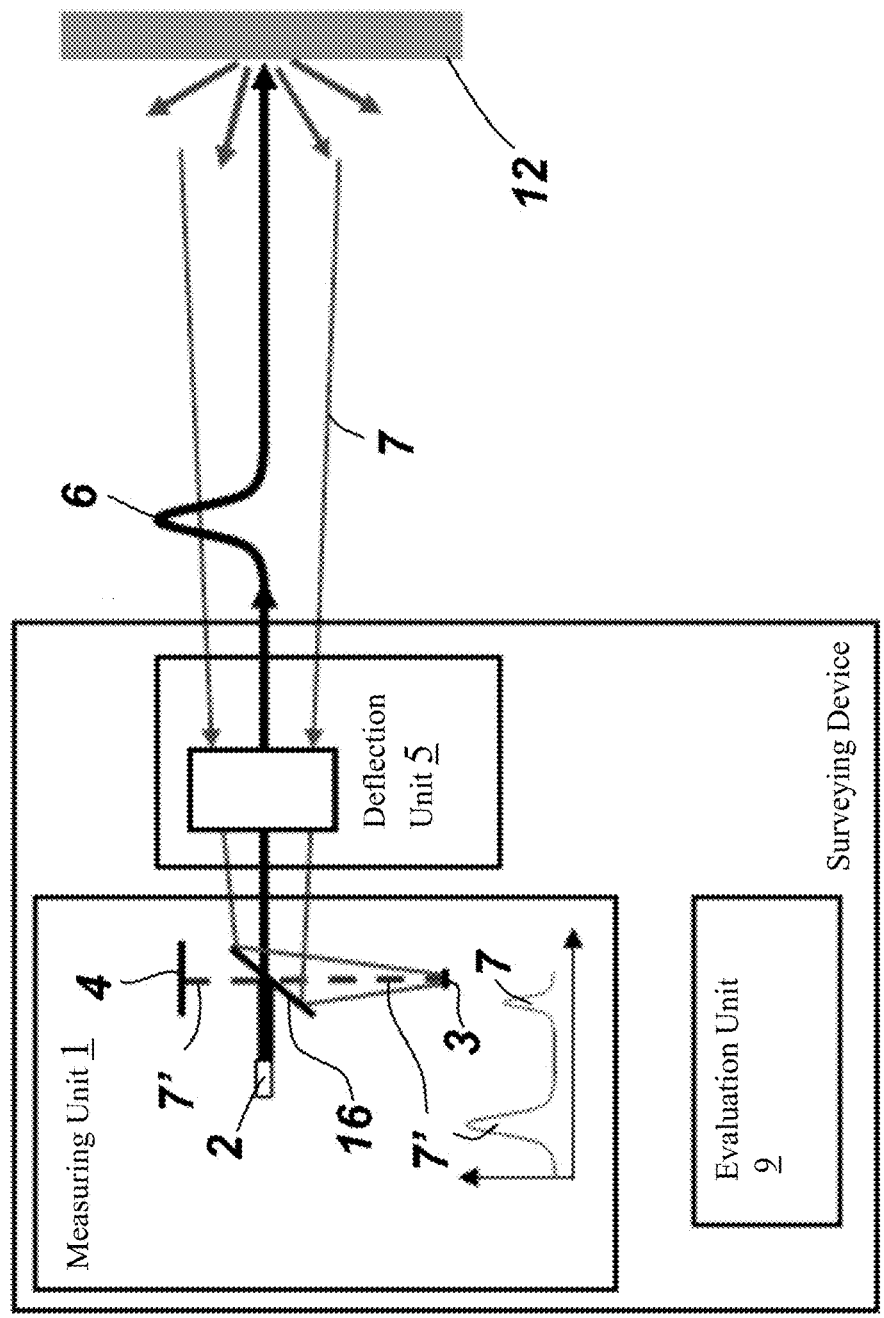
FIG. 1: shows the schematic illustration of a surveying device according to the invention.

FIG. 1 schematically illustrates a surveying device according to the invention, which has a distance measurement unit 1, a deflection unit 5 and an evaluation unit 9, wherein the latter can have an FPGA (field programmable gate array) and a CPU (central processing unit). The evaluation unit 9 can also be set up in an SoC-FPGA architecture, which has a HW processor system, consisting of a processor, peripherals and memory interfaces with broadband bus connection to the FPGA part. The distance measurement unit 1 has at least one reference signal unit 4 and a receiver 3. The receiver 3 is provided for receiving the receive signals 7 returning from the target object 12, and/or the reference signals 7', which are the transmission signals 6 that are diverted by a partially transmissive mirror 16. The transmission signals 6 are transmitted by the transmitter 2 (for example a laser diode, superluminescent LED with optical amplifier or fiber laser) and guided through an optical system having a deflection unit 5 onto the target object 12.

Figure 2:
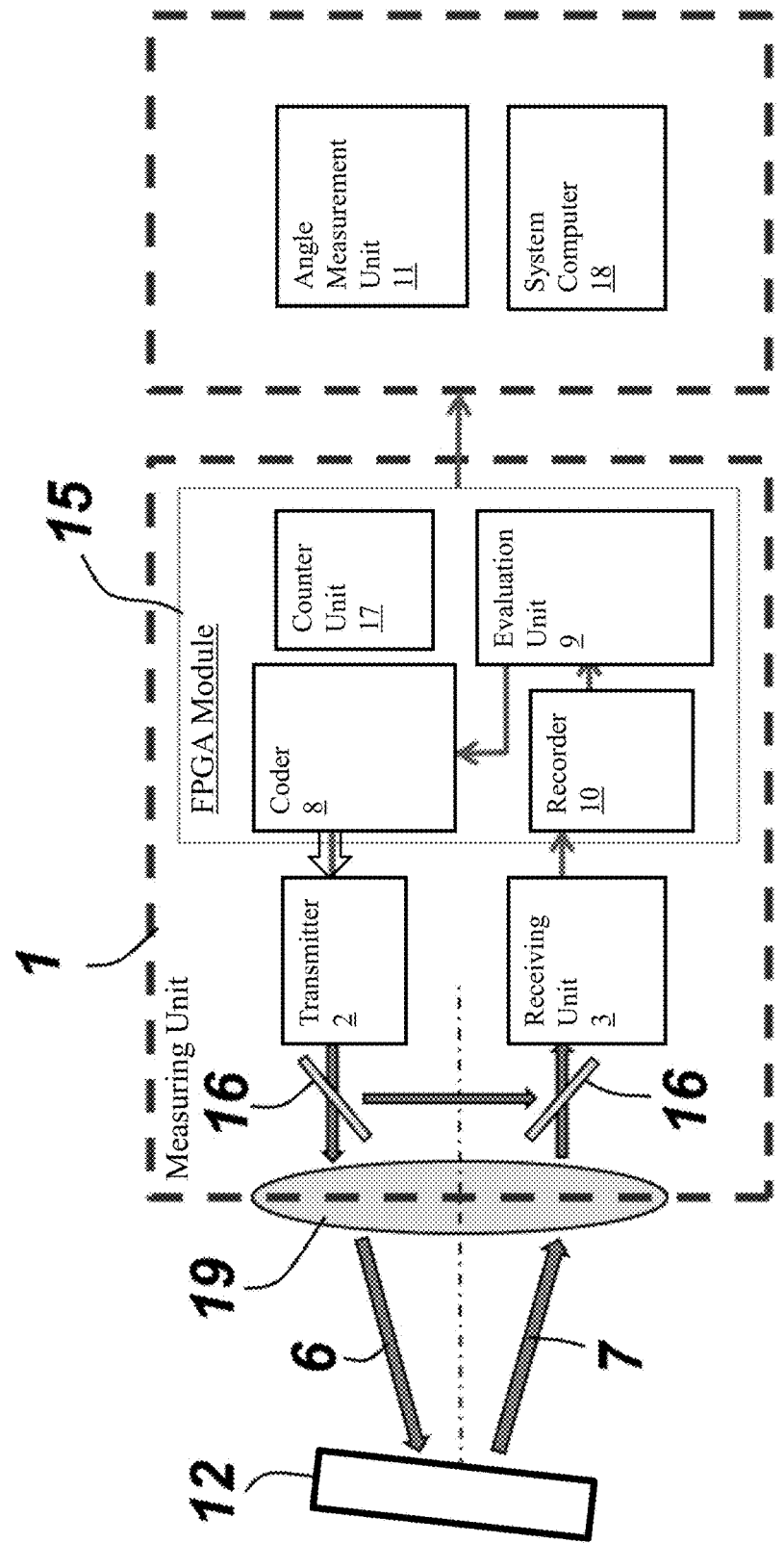
FIG. 2: shows the principle diagram of the constituent parts of a surveying apparatus according to the invention.

FIG. 2 shows the principle diagram of a surveying device according to the invention, which has—as is customary in generic laser surveying devices such as laser scanners, profilers and laser trackers—at least one angle measurement unit 11 and a system computer 18 in the base, and in the actual distance measurement unit for example at least the diverse components shown in FIG. 1.

A coder 8, which is shown here separately from the transmitter 2, but can also be integrated therein, provides coded signals 6, such as pulses, pulse sequences or pulse bursts and/or also wavelengths or polarizations. The transmitter 2 transmits these coded signals 6 for example to an optical unit 19, which guides the signals 6 onto a target object 12. To this end, a dedicated deflection unit having a further angle measurement unit might be required, which is not shown. If desired, the transmission signal 6 can be partially diverted along its path, for example by way of a partially transmissive diverting element 16. The transmission signal 6 is diverted onto a further diverting element 16, which directs the transmission signal 6 in turn onto the receiving device 3.

The signal 7 that is reflected at the target object 12 travels back to the surveying device and is there likewise coupled into the receiver 3. The receiver 3 thus receives both the transmission signal 6 (in the form of the reference signal 7') and the receive signal 7. The purpose of the internal optical path via the diverting elements 16 is the provision of a starting pulse for generating a drift-free distance zero point, i.e. for calibrating the absolute measurement distance between the measurement apparatus and the target object. It is likewise possible, as is already known in the prior art, to allow either only the reference signal 7' or only the receive signal 7 onto the receiving device 3, instead of both signals 7' and 7 at the same time. This takes place for example in the form of a pivotable cover for beam interruption. The receiving device 3 comprises both an analog signal path and a digitalization unit, consisting among others of an analog-to-digital converter which is adapted for cycles in the GHz range. A recorder 10 records everything at least temporarily that arrives at the receiving unit 3. Decoding and evaluation of the signal data can then take place in the control and evaluation unit 9. Most digital modules, such as 8, 9 and 10, can be realized in an FPGA module 15.

Essential information about the transmissions from the transmitter 2 (modulation or coding, number of pulses, time stamps of transmission etc.) are generated and managed by the control and evaluation unit 9. At each transmission signal, the control and evaluation unit 9 prompts an increase of the count status of a signal coding counter of the counter unit 7 by one counting unit. On the receiving-side, the control and evaluation unit 9 analyzes the digitalized signals and stores the elapsed DRW periods which are associated with the receive pulses by way of reading the signal coding counter of the counter unit 17. In the distance calculation, the sum of said elapsed DRW pulse intervals is ascertained and added to the time of flight which is measured to the picosecond in the current record window. As a result, the absolute time of flight is also known over a plurality of ambiguity intervals.

In a further embodiment with "seamless" data buffering, that is to say without block-wise data buffering, a time counter of the counter unit 17 is used, which acts as a clock and preferably increments with the cycle of the analog-to-digital converter. If desired, it is additionally possible to maintain the signal coding counter. The control and evaluation unit 9 stores an entry (time stamp) in a transmission register for each transmitted pulse pattern. The entry consists of the time stamp of the counter acting as a clock and of the signal code of the signal coding counter. In special pulse sequence codings, as in the case of double pulses with coded mutual distance, it also suffices to only store in the transmission register the time stamps associated with the individual pulses. The code of the transmission signal can then be reconstructed at any time on the basis of the stored time stamps. In this case, it is possible to dispense with the signal coding counter in the counter unit 17. On the receiving-side, the control and evaluation unit 9 organizes a second register. At each recognized receive signal pulse, i.e. at a receive signal pulse detected by way of sufficient SNR (signal-to-noise ratio), the status of the counter of the counter unit 17 acting as a clock is synchronously read and stored in a receive pulse register together with the signal code ascertained by decoding. In special pulse sequence codings, it is again sufficient to store only the time stamps of the received individual pulses in a pulse sequence in the receive pulse register. By comparing the entries in the transmission register with the entries in the receiving register, the matching transmitted signals are paired with the, frequently plurality of, received signals according to signal decoding, and the time of flight is calculated directly by way of the registered time stamps. In case the registers contain no signal coding entries, the register evaluation requires an intermediate step. In this decoding step, the time stamp arrangements in the registers forming code patterns in each case are ascertained by way of a searching process. As above, the associated time stamps of transmission and receive pulses can then be paired with this decoding information, and the time of flight and thus the distance can be calculated.

In an embodiment that is simplified compared to FIG. 2, the internal light path of the starting pulse can also be interrupted by way of a switching element, in which case only the signals that are reflected back by the target objects are received by the receiving unit 3. This has the advantage that multiple targets can be evaluated more easily and more robustly. The starting pulse is then allowed onto the receiver unit 3 only at very specific times, for example when the deflection unit 5 guides the external laser beam 6 in a direction where no object to be surveyed is located.

Figure 3A:
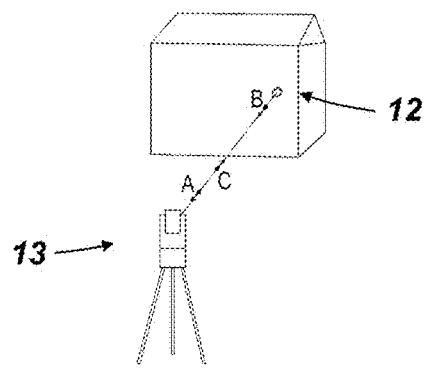
FIGS. 3a-e: show the ambiguity in the case of a plurality of transmitted signals which are in-flight at the same time.

FIG. 3a shows a surveying scenario in which a laser tracker 13 emits a plurality of modulated pulses A, B, C and D (not shown) onto a targeted house as the target object 12. What is shown is the time at which the pulses A, B and C are in flight, wherein A and B are already returning, reflected by the house, as receive signals, while pulse C as the transmission signal is still in flight to the target object 12. Limiting to four different coding patterns is purely an example.

Figure 3B:
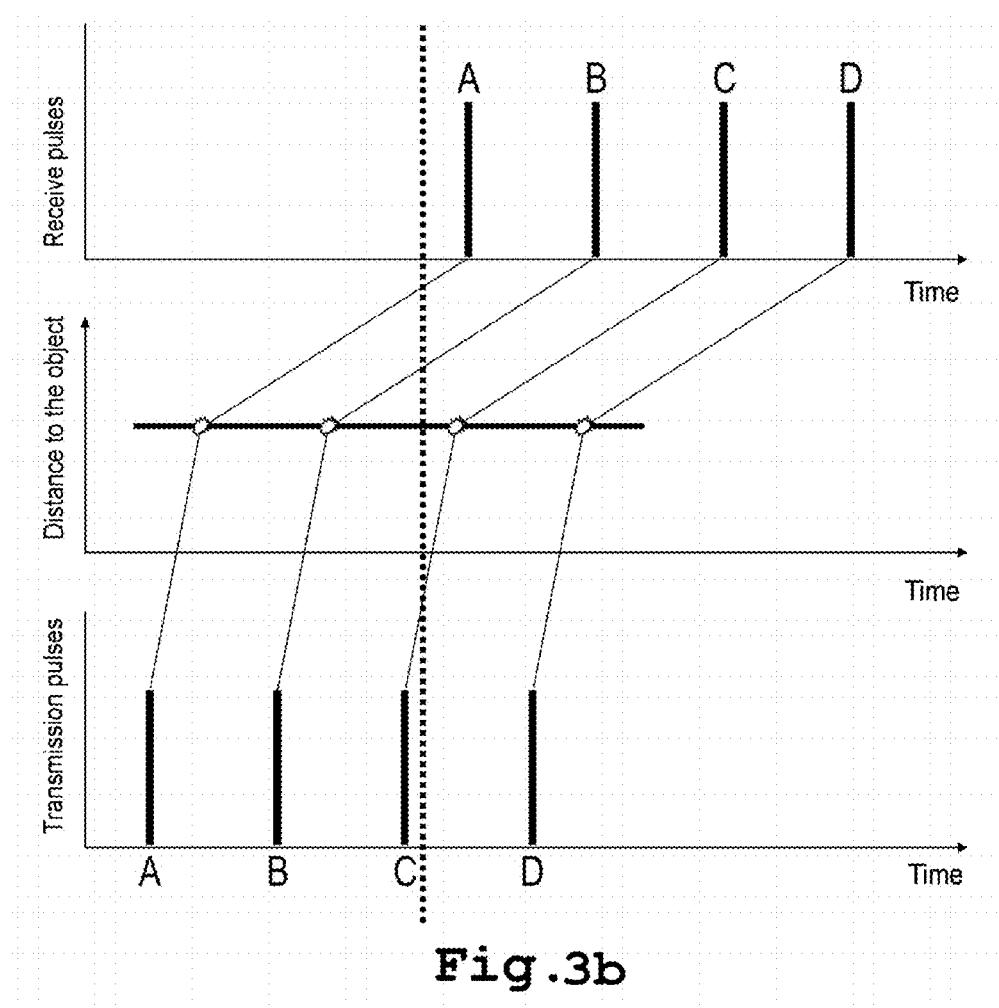

In FIG. 3b, the time shown in FIG. 3a is plotted with the dashed vertical line in three time axes, wherein the central time axis illustrates qualitatively that all four signals A, B, C and D have the same distance from the object. The bottom time axis shows the transmission times of the signals, and the top time axis shows the arrival times of the reflected signals at the surveying device. What can be seen here is that at the time shown in FIG. 3a (dashed line), signal C has not yet arrived at the house wall, and signals A and B have been reflected but have not yet arrived at the surveying device, and signal D has not yet been transmitted.

Figure 3C:
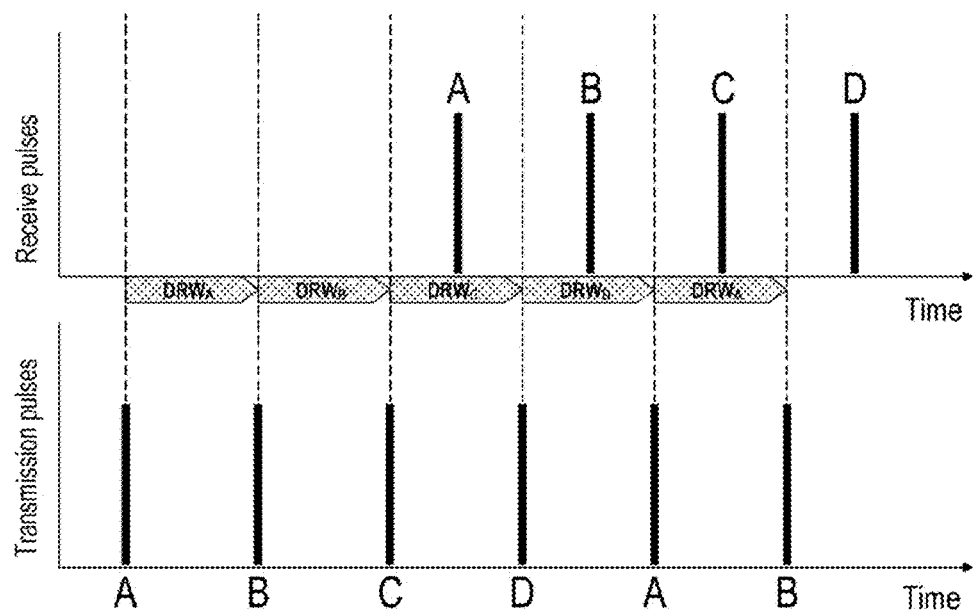

FIG. 3c shows the same transmission scheme of FIGS. 3a and 3b and the recording periods $DRW_A$, $DRW_B$, $DRW_C$ and $DRW_D$, plotted on the time axis. This is the first embodiment of the uniqueness resolution which uses time sections (recording periods $DRW_j$) which are marked by way of time or signal coding counters. The transmission of signal A starts the recording window $DRW_A$, the transmission of signal B starts the recording window $DRW_B$ and so on. What can be seen is that the receive signal A arrives back at the receiver just as the recording period $DRW_C$ is active. With a corresponding delay, the reflected signals B, C and D also arrive back at the surveying device.

Figure 3D:
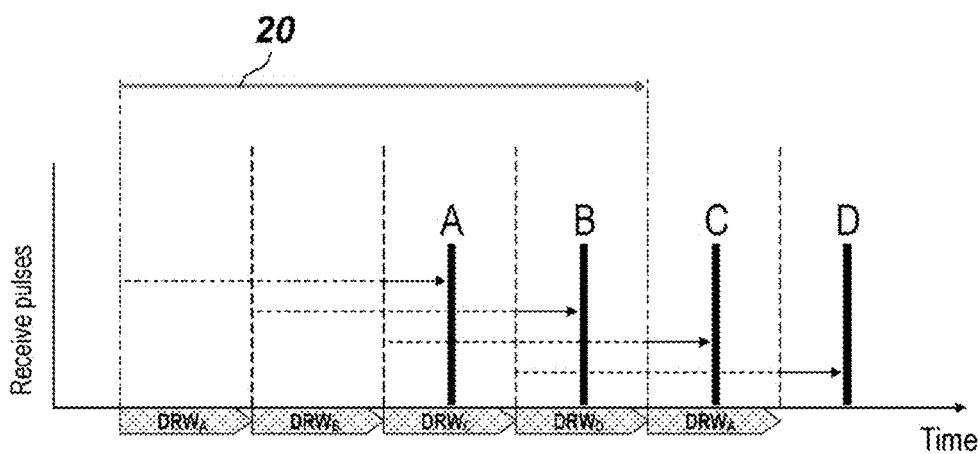

FIG. 3d shows the calculation scheme for the time of flight of the individual pulses, and also the longest period 20 of the emission coding, which comprises the transmission times of the pulses A, B, C and D. The dashed horizontal lines indicate that these distances are not explicitly surveyed, but are taken into consideration only in the form of an additional calculation. What is explicitly measured here is, for example, the time between the transmission of signal C and the return of signal A (horizontal arrow, solid line). On the basis of the association: receive signal A—$DRW_C$, a determination regarding the time which has elapsed since transmission is made directly. A counter (counter unit 17) marks in each case the current buffer ($DRW_j$). After the DRW terminates, the control and evaluation unit 9 searches the content of the DRW for receive signals and decodes the associated codes (A, B, . . . ). The control and evaluation unit 9 ascertains, on the basis of the code of the receive signals and of the counter value associated with the DRW buffer, the number of elapsed DRW intervals, which corresponds to the dashed horizontal lines. The entire signal time of flight is the sum of the elapsed integer DRW intervals and the ascertained relative time of flight of the just then evaluated DRW buffer (solid horizontal lines).

Figure 3E:
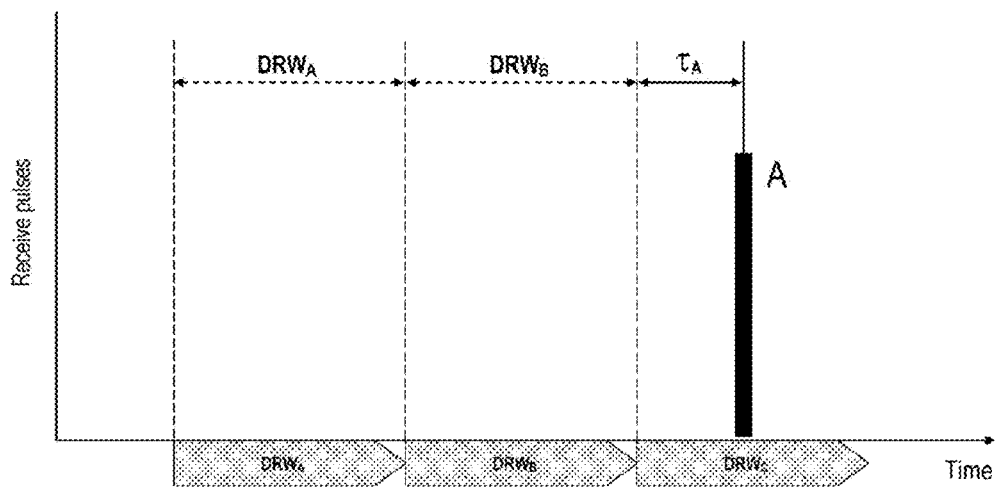

FIG. 3e shows, in detail, the time distance components to be added, which can be seen from FIG. 3d: $DRW_A + DRW_B + \tau_A$. The distance associated with the transmission pulse with coding A here corresponds to $0.5 * C_0 * (DRW_A + DRW_B + \tau_A)$, wherein $C_0$ is the speed of light through air.

Figure 4A:
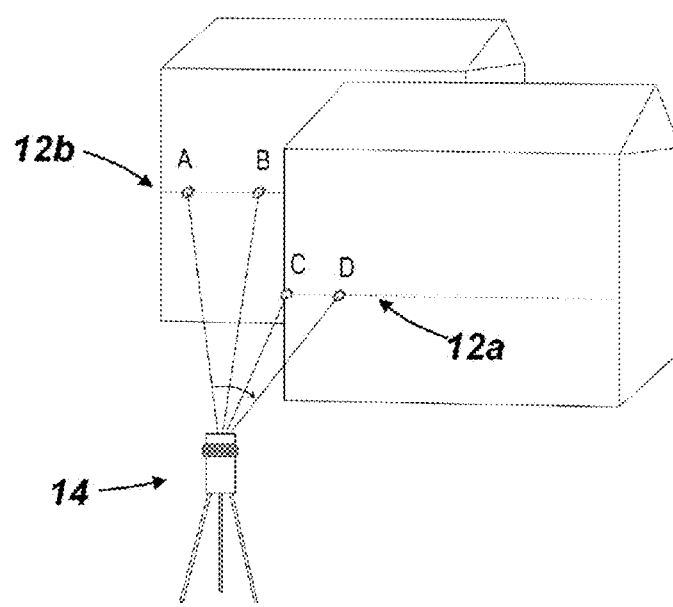
FIGS. 4a-e: show the ambiguity in the case of a sudden distance jump of transmitted signals.

FIG. 4a shows a surveying scenario in which a laser scanner, rotary laser or laser profiler 14 samples a plane continuously by way of its rotation. This plane in the example extends along two house walls, wherein a sudden distance jump occurs during scanning. While signals A and B are still in the process of striking the rear house 12b, signals C and D are firstly reflected on the house wall 12a which is located significantly further toward the front. The individual pulses and their locations are not shown in this illustration.

Figure 4B:
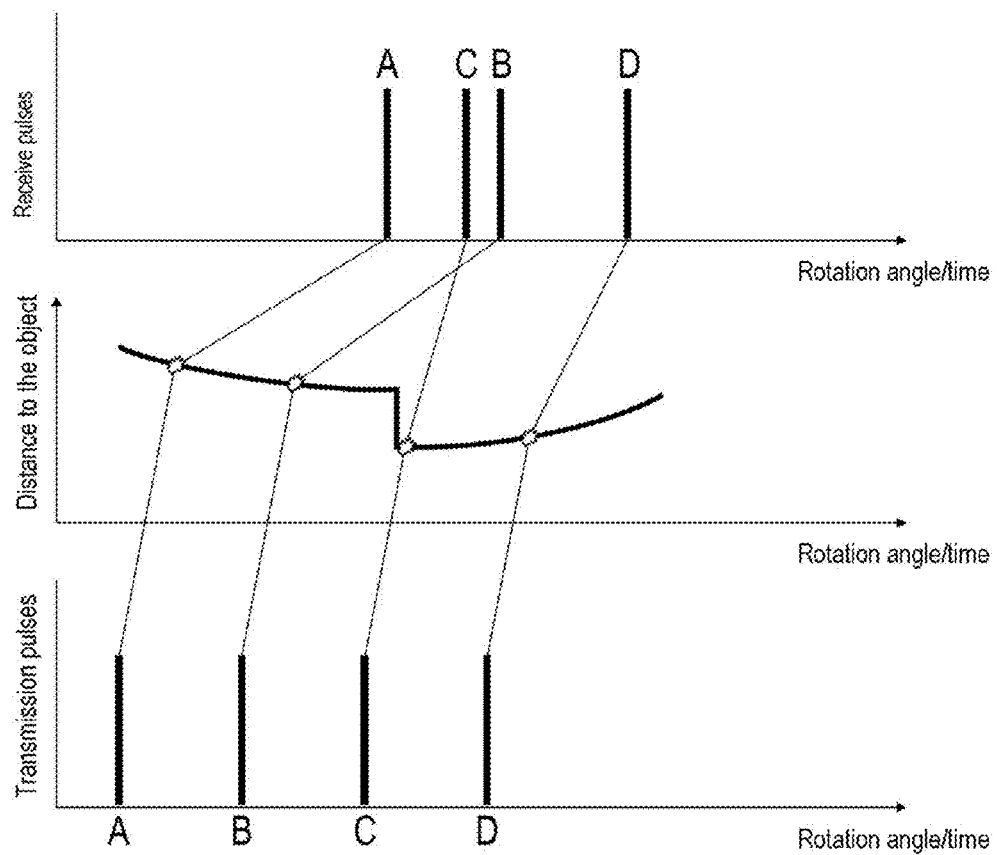

FIG. 4b illustrates, analogously to FIG. 3b in the center, that the distance to the object changes with the rotation of the laser scanner, wherein in this case the distance jump from one house wall 12b to the other house wall 12a is markedly noticeable as a kink. As a result, signal C arrives at the receiver even before signal B.

Figure 4C:
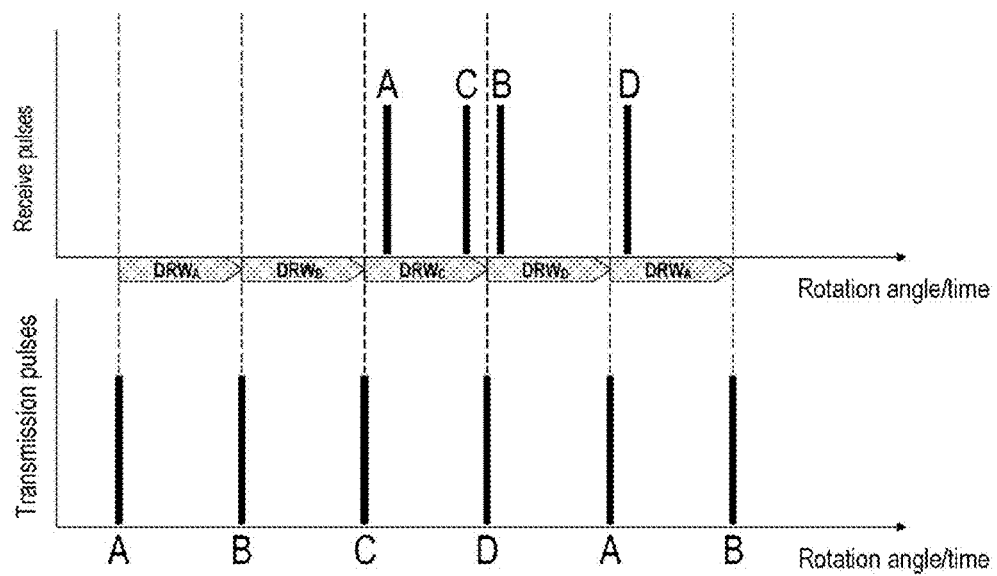

FIG. 4c illustrates, analogously to FIG. 3c, the manner in which the inventive marking method solves this interleaving problem using an interval counter (signal coding counter) and/or time stamp counter (time counter) and establishes the uniqueness of the transmission and receive pulse association. By way of example, the first embodiment of the inventive method is illustrated with the recording periods $DRW_j$, which in turn are associated with the transmission coding by way of the index $j=(A, B, \ldots)$ The recording periods $DRW_A$, $DRW_B$, $DRW_C$ and $DRW_D$ are likewise started, in each case triggered by the transmission of the corresponding signals A, B, C and D.

Figure 4D:
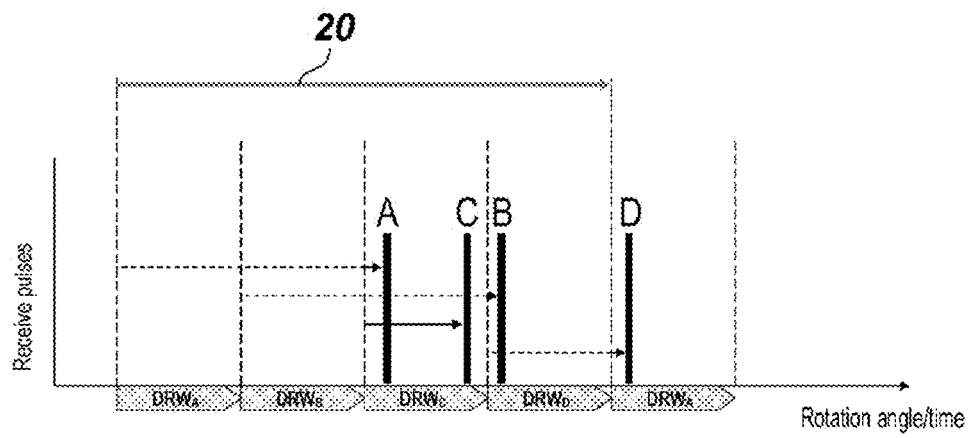
Figure 4E:
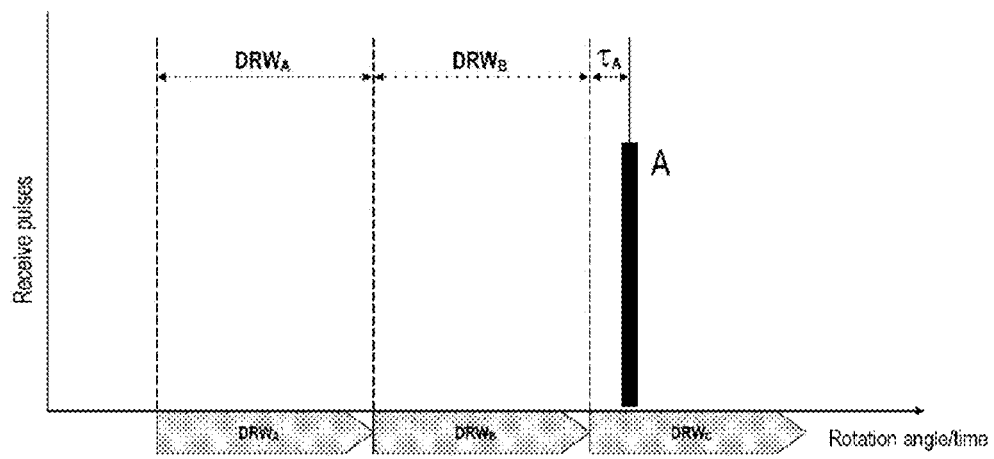

FIG. 4d shows, analogously to FIG. 3d, the way in which the correct distances are uniquely calculated. By way of example, the receive pulse with code B is received in the DRW having the counter value D ($DRW_D$), the control and evaluation unit 9 immediately calculates that two complete DRW intervals lie between B and D. The total time of flight thus results from the duration of $DRW_B$, $DRW_C$ and the currently measured partial time of flight $\tau_A$ in the $DRW_D$. This is what FIG. 4e shows in detail: $DRW_A + DRW_B + \tau_A$.

Figure 5A:
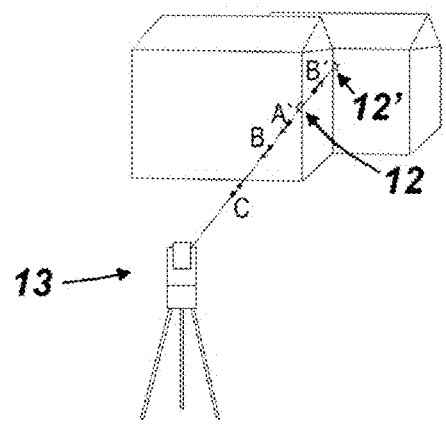
FIGS. 5a-c: show the ambiguity in the case of multiple targets.

FIG. 5a shows a surveying scenario, in which a laser tracker 13 aims the laser beam at a house edge 12, and in the process also partially aims it at the house 12' which is situated behind it. Owing to the expanded cross-section dimension of the laser beam, the measurement beam is divided at object edges into two, one part of the transmission signal strikes the closer house wall 12 in the foreground, and the remaining part of the light strikes the surface of the distant house 12'. This so-called multiple target problem is distinguished by the fact that the receiver unexpectedly receives a plurality of reflections and is no longer able to associate them uniquely with the transmission signal. The reflection of the signal A at the first house wall 12 has already arrived back in the surveying device 13 at the time shown. The reflection of the signal A at the rear house wall 12', on the other hand, is still on its way back to the laser tracker 13. The signal B, which was reflected by the first house wall 12, is likewise still in flight. The proportion of the signal B that is not reflected at the first house wall 12 (B') is still on its way to the rear house wall 12', and the transmission signal C has just left the surveying device 13.

Figure 5B:
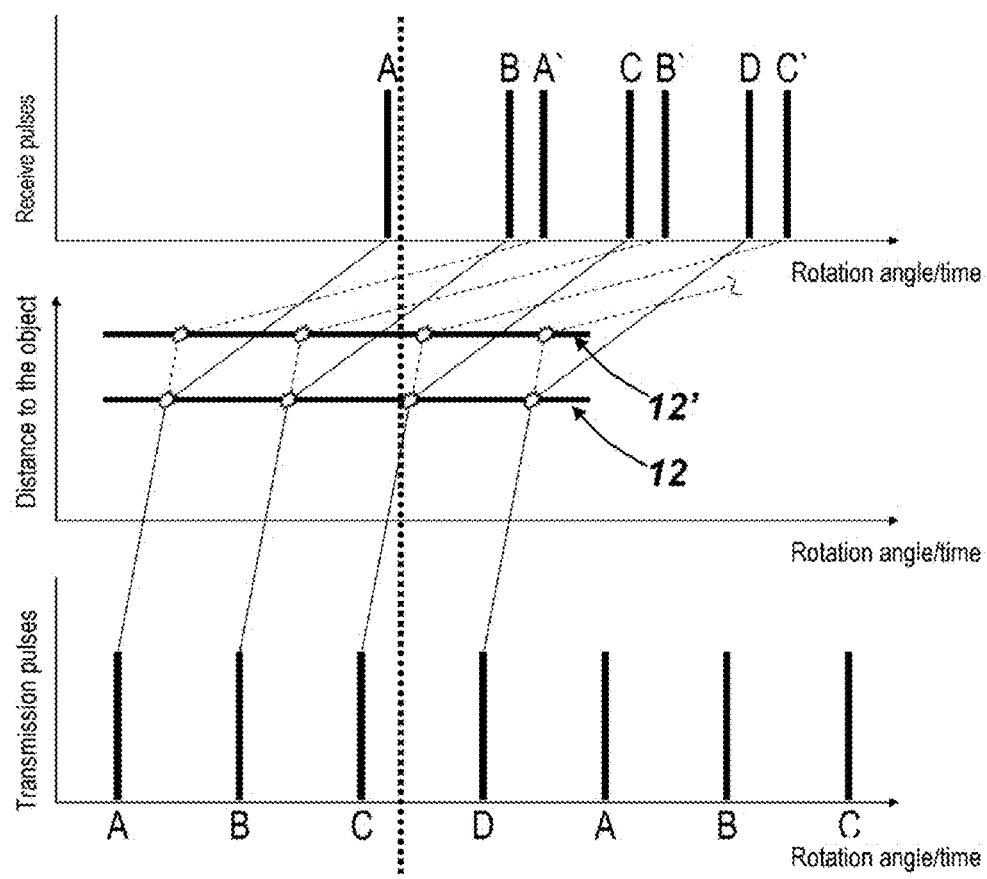

FIG. 5*b* shows, analogously to FIG. 3*b*, the time illustrated in FIG. 5*a* using the vertical dashed line. The central axis shows the two objects 12 and 12', at different distances, wherein the reflections A', B', C' from the object 12' are received with a delay on account of the longer flight distance.

Figure 5C:
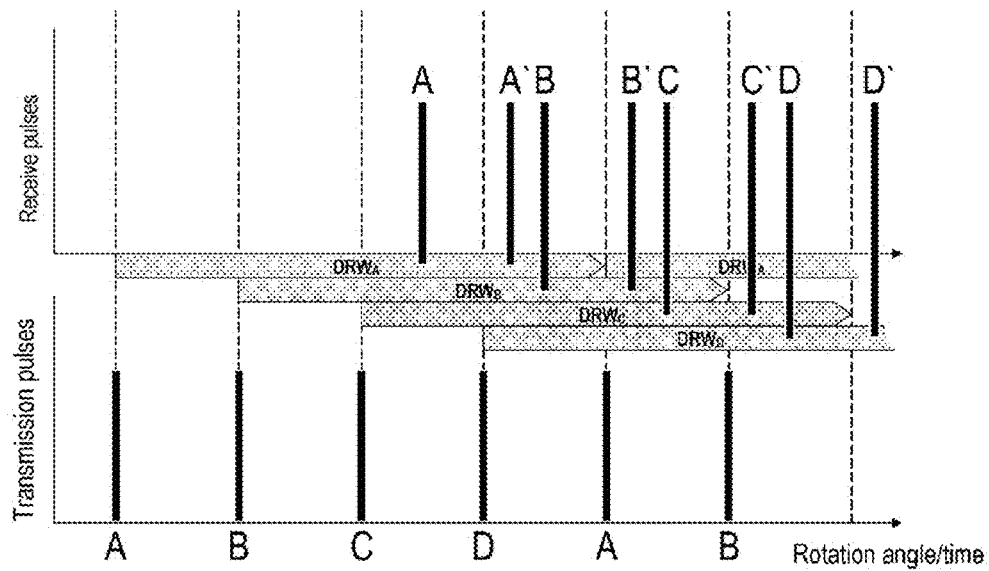

FIG. 5*c* shows the overlap of the received signal sequences which occurs in the process, and a solution which is suggested herefor. The recording periods $DRW_A$, $DRW_B$, $DRW_C$ and $DRW_D$ correspond to the second realization form for ambiguity resolution. The $DRW_j$ intervals (j=A, B, . . . ) in each case suffice until a corresponding signal of the same code is transmitted again. $DRW_A$ thus suffices, for example, from the transmission of the pulse A up to the next transmission of the pulse A. The lengths of the individual data buffers thus comprise the entire code length 20. In order to achieve the fastest and most robust receive signal evaluation, the DRWs are here intended only for their own signal type, such that, for example, while $DRW_A$ records all receive signal pulses, the control and evaluation unit 9, upon terminated registration of $DRW_A$, captures and evaluates only the returning pulse A and the returning pulse A'.

Figure 5D:
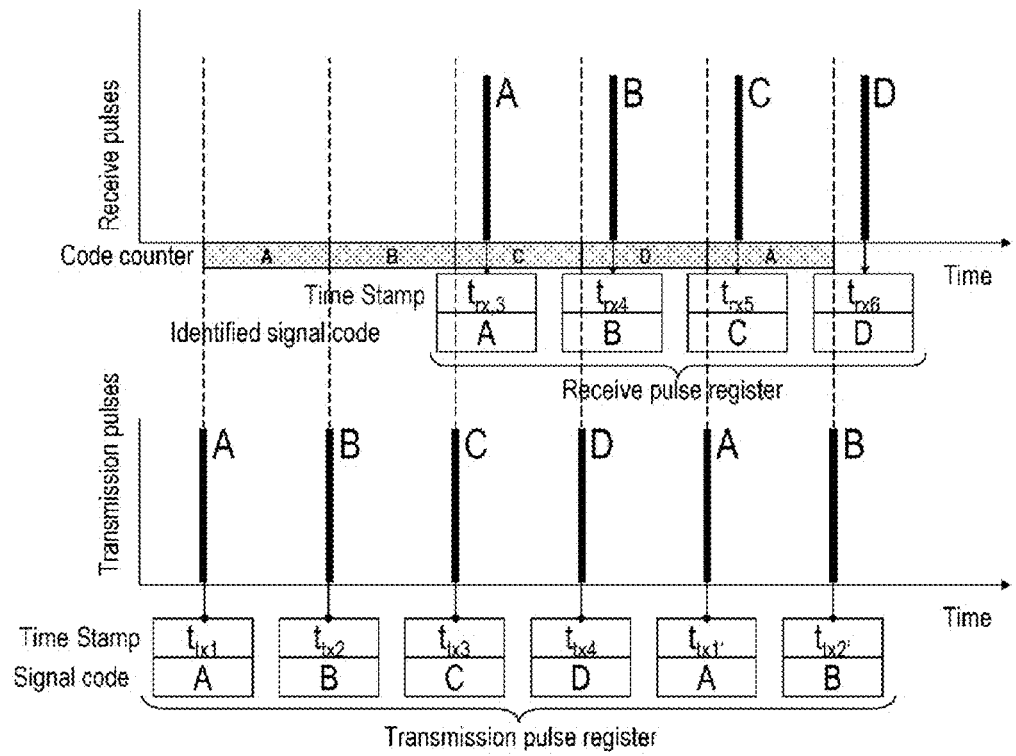
FIG. 5d: shows the embodiment of the ambiguity resolution.

FIG. 5*d* illustrates a further embodiment, without blockwise data buffering. This method uses a type of shift register in which the received digitalized raw data is analyzed and processed "seamlessly" by the control and evaluation unit 9. A time counter of the counter unit 17, acting as a clock, increments preferably with the cycle of the analog-to-digital converter. On the transmitter-side, each pulse is provided with a time stamp read from the clock, and in the process an entry is made in a transmission pulse register. If desired, the signal coding counter is also read and an additional entry is made in the transmission pulse register. On the receiver-side, the received data stream is searched "seamlessly" in real time for receive signals. Once a receive signal arrives and is recognized, at least a time stamp that is read from the clock is entered in a receive pulse register. If desired, the signal code ascertained by decoding is also entered as an additional entry in the receive pulse register. The control and evaluation unit 9, or an evaluation unit which is connected downstream, continuously compares the entries in the transmission pulse register with the entries in the receive pulse register. If for the transmitted pulse pattern j at least one received pulse pattern having the same coding j is found within the duration of the longest period 20 of the total coding sequence, the time stamps associated with the transmission and receive pulses are paired, and the time of flight is directly calculated by way of difference formation of the time stamps and adding the time intervals τ that are interpolated by subsampling. The ambiguity problem is automatically resolved using this fast incrementing counter that acts as a clock.

As an alternative to a simple search for a signal pattern of code type A, B, C . . . , it is also possible to compare some of the length 20 or the entire length 20 of the coded pulse sequence in the form of a reference pulse sequence on the whole over the respective recording period $DRW_j$. This is done, for example, in the form of a cross-correlation. This integral type of signal evaluation has the advantage of a more robust recognition and resolving of multiple targets. In the case of double targets, a correlation search will produce two receive signals of the same pattern with code j and j', and the evaluation process will thus have in each case one distance to the two associated objects.

Figure 6A:
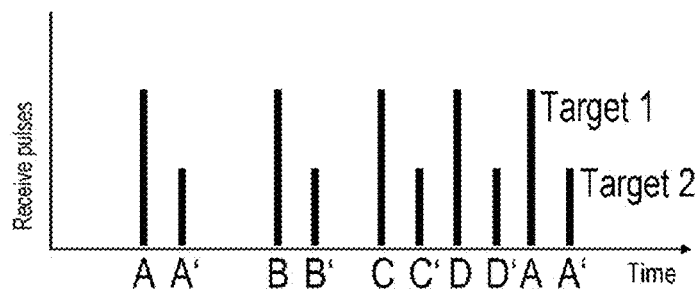
FIGS. 6a-b: show the ambiguity in the case of closely located double targets.
Figure 6B:
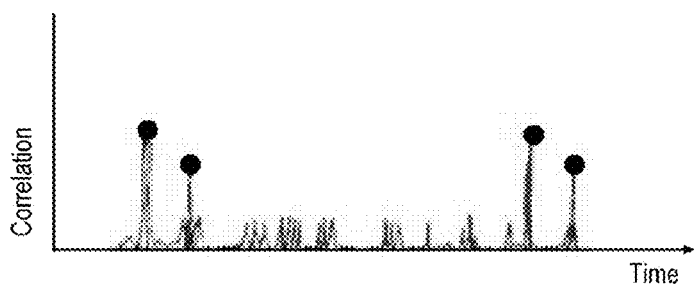

FIG. 6*a* shows an example of a simple interval modulation, and FIG. 6*b* shows the associated autocorrelation function for the case of a double target j, j'. The cross-correlation uniquely shows two targets with the associated unique times (amplitude values marked with round dots).

FIGS. 6*a* and 6*b* show the ambiguity problem in the case of double targets which are located closely to one another. In particular, it is possible for the electrical receive pulses to overlap under certain circumstances, which makes evaluation more difficult. Such situations with double targets can be resolved in a particularly illustrative manner using the embodiment variant of the invention, as is described relating to FIG. 5*c*. The lengths of the individual DRW data buffers comprise the entire transmitted code length, and the times of the two reflections are ascertained by way of cross-correlation of the receive signal sequence stored in the buffer with a pattern sequence of the transmission signal. The result (round dots) of a cross-correlation search is illustrated in FIG. 6*b*.

FIGS. 7*a-e* show different coding or modulation options that can be used according to the invention.

Figure 7A:
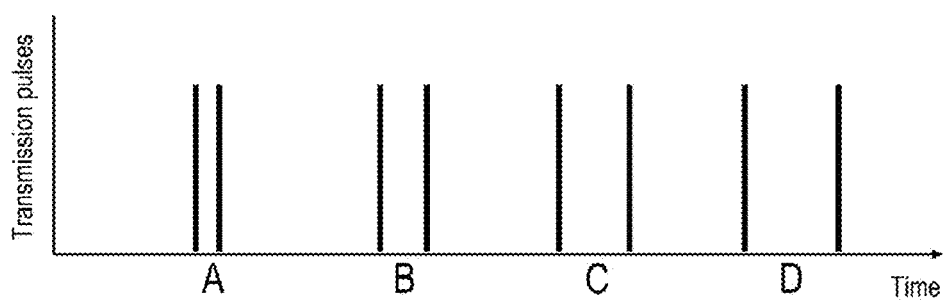
FIGS. 7a-e: show an exemplary selection of signal modulations according to the invention.

FIG. 7*a* shows a double pulse modulation with coded distance between the pulse pairs. In their entirety, the pulse pairs are designated A, B, C and D. If the sequence A, B, C, D of the signal sequence is additionally permutated, if for example a sequence A, B, C, D-B, A, C, D-C, A, B, D-A, C, B, D is transmitted, the uniqueness distance can additionally be extended by a multiple.

Figure 7B:
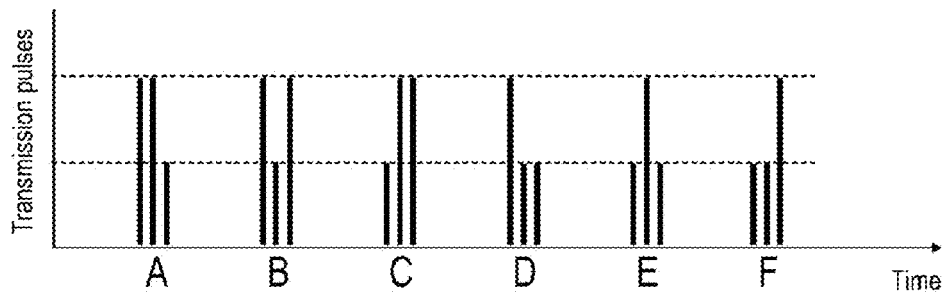

FIG. 7*b* shows a pulse amplitude modulation consisting of three pulses of equal distance, wherein one or two pulses from the group are reduced slightly in terms of their amplitude. The illustrated modulation sequence thus generates the coding sequence A, B, C, D, E, F.

Figure 7C:
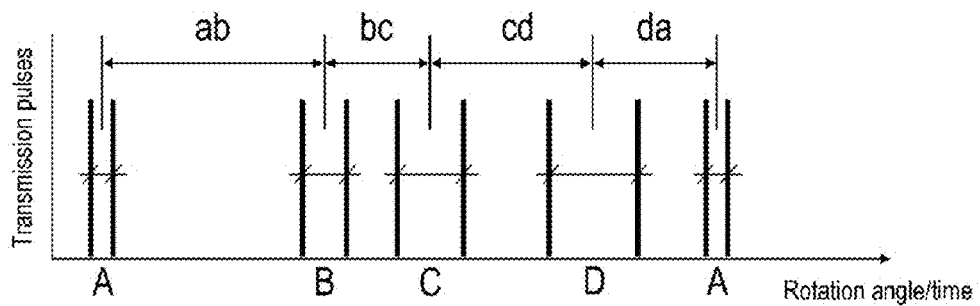

FIG. 7*c* shows the modulation of FIG. 7*a*, wherein additionally coding of the intervals ab, bc, cd and da is effected. In the case of this coding, the individual pulse identification is marked twice and thus redundant. If, for example, an object surface is measured at an oblique angle and the distance continuously changes during the scan, one or the other coding type can be falsified. However, it is rather improbable for both codings to be disturbed or falsified at the same time. As a result, redundant signal coding is more robust in principle. The degree of redundancy and thus also the probability of correct measurements for multiple targets and dynamically scanned surfaces thus increase by using double coding.

Figure 7D:
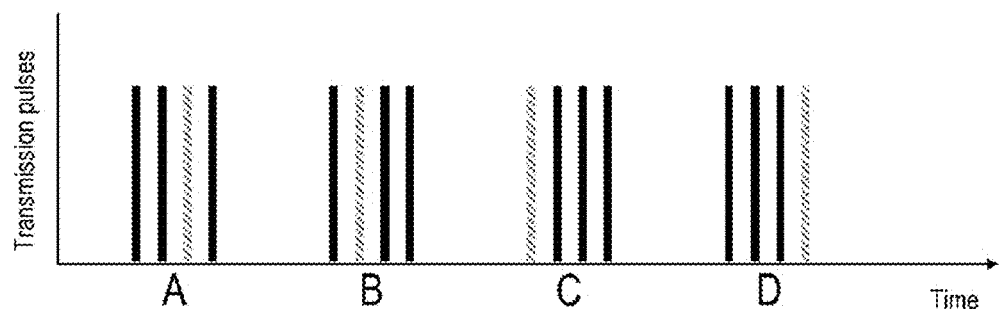

FIG. 7*d* shows a burst modulation with position coding, wherein once again the bursts in their entirety are designated in each case A, B, C and D.

Figure 7E:
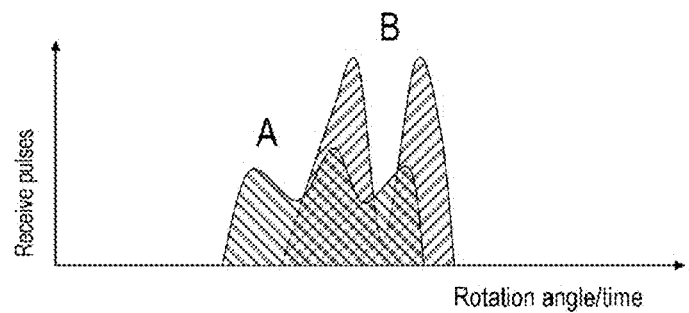

FIG. 7*e* shows a superposition of two signals A and B detected at the receiver. Such signal superpositions are frequent, for example if the reference signal is guided, via the internal light path, as a starting pulse onto the receiver at the same time. These two signals can be distinguished, for example, by coding the starting pulse with orthogonal modulation compared to the receive pulses which are returned by the target objects.

It is to be appreciated that the previously illustrated and explained figures merely schematically illustrate possible exemplary embodiments. It should be noted in particular that the explicitly illustrated and explained examples, without exception, can be used both separately and in any desired combination, and can also be combined with corresponding apparatuses and methods of the prior art.

What is claimed is:

1. A distance measurement apparatus for measuring the time of flight of electromagnetic signals, comprising:
   a transmitter for transmitting n differently coded transmission signals according to a pattern specified by a coder, wherein the n differently coded transmission signals are temporally repeated in the same order, wherein n is greater than 1,
   a receiver for detecting the signals reflected by at least one object as receive signals,
   a counter unit having a time counter for writing time counter values, which are generated in each case with the transmission of the transmission signals and the receipt of the receive signals, into at least one register, and
   a control and evaluation unit for calculating the time of flight on the basis of
   decoding the receive signals and
   reading the register of the counter unit.

2. The distance measurement apparatus according to claim 1, wherein:
   the transmission signals are likewise guidable to the receiver as reference signals through feedback inside the apparatus, wherein the control and evaluation unit is also configured for decoding the reference signals.

3. The distance measurement apparatus according to claim 1, wherein:
   the counter unit furthermore has a signal coding counter, which generates, simultaneously with each signal emission, an associated signal coding counter value which correlates to the coding of the respective transmission signal.

4. The distance measurement apparatus according to claim 1, wherein:
   coding of the signals comprises at least one of:
   interval modulation,
   amplitude modulation,
   frequency modulation,
   distance-modulated double or multiple pulses,
   burst modulation,
   polarization modulation, and
   wavelength modulation.

5. The distance measurement apparatus according to claim 1, wherein:
   the control and evaluation unit is configured to directly identify the received signals after the decoding as the reflections of the transmitted signals.

6. The distance measurement apparatus according to claim 1, wherein:
   the control and evaluation unit is configured to directly calculate the distance travelled by the transmitted signals, which are recognized as returning signals and identified by way of decoding, on the basis of the time counter values.

7. The distance measurement apparatus according to claim 1, wherein:
   the control and evaluation unit is configured to directly calculate the distance travelled by the transmitted signals, which are recognized as returning signals and identified by way of decoding, on the basis of the time counter values and the signal coding counter values.

8. The distance measurement apparatus according to claim 1, wherein:
   generating a signal coding counter value triggers the beginning of a recording period, wherein the recording period is associated with each signal coding counter value.

9. The distance measurement apparatus according to claim 1, wherein:
   generating a signal coding counter value triggers the beginning of a recording period, wherein the recording period is associated with the time counter value at the beginning of the recording period.

10. The distance measurement apparatus according to claim 1, wherein:
    the recording period is at least long enough to comprise a complete sequence of a coded signal sequence.

11. The distance measurement apparatus according to claim 1, wherein:
    a plurality of recording periods, in terms of time follow each other seamlessly or overlap.

12. The distance measurement apparatus according to claim 1, wherein:
    the control and evaluation unit is configured to calculate the distance travelled by the transmitted signals, which are recognized as returning signals and identified by way of decoding, on the basis of
    the time counter value at the transmission time of the transmission signal,
    the time counter value at the starting point of the recording period in which the signal was received, and
    the temporal position of the receive signal within the recording period.

13. The distance measurement apparatus according to claim 1, wherein:
    the control and evaluation unit is configured to calculate the distance travelled by the transmitted signals, which are recognized as returning signals and identified by way of decoding, on the basis of
    the signal coding counter value of the recording period, and
    the temporal position of the receive signal within the recording period.

14. The distance measurement apparatus according to claim 1, wherein:
    the signal duty cycle is below 50%.

15. The distance measurement apparatus according to claim 1, wherein:
    the signal duty cycle is below 5%.

16. The distance measurement apparatus according to claim 1, wherein:
    the signal duty cycle is below 0.5%.

17. The distance measurement apparatus according to claim 2, wherein:
    the reference signals received by the receiver are orthogonal to the receive signals reflected by the targets.

18. A method for measuring the time of flight of electromagnetic signals, carried out by a laser scanner, profiler, a total station or a laser tracker comprising:
    a transmitter for transmitting coded transmission signals according to a pattern specified by a coder, said transmitter transmitting n differently coded transmission signals temporally repeated in the same order, wherein n is greater than 1,
    a receiver for detecting the signals reflected by at least one object as receive signals,
    a counter unit having a time counter for writing time counter values, which are generated in each case with the transmission of the transmission signals and the receipt of the receive signals, into at least one register, and a control and evaluation unit for calculating the time of flight on the basis of decoding the receive signals and reading the register of the counter unit.

\* \* \* \* \*